(12) United States Patent
Astruc et al.

(10) Patent No.: US 7,616,130 B2
(45) Date of Patent: Nov. 10, 2009

(54) METHOD AND A DEVICE FOR PROCESSING AND DISPLAYING AIRCRAFT PILOTING INFORMATION

(75) Inventors: Joël Astruc, Puyricard (FR); Paul Eglin, Aix en Provence (FR)

(73) Assignee: Eurocopter, Marignane (FR)

( * ) Notice: Subject to any disclaimer, the term of this patent is extended or adjusted under 35 U.S.C. 154(b) by 324 days.

(21) Appl. No.: 11/710,549

(22) Filed: Feb. 26, 2007

(65) Prior Publication Data

US 2007/0273544 A1    Nov. 29, 2007

(30) Foreign Application Priority Data

Feb. 27, 2006    (FR) .................................. 06 01734

(51) Int. Cl.
G01C 23/00    (2006.01)
(52) U.S. Cl. .................. 340/946; 73/178 H; 244/17.11; 340/971; 340/974; 701/14
(58) Field of Classification Search ......... 340/963–980; 701/4–14
See application file for complete search history.

(56) References Cited

U.S. PATENT DOCUMENTS

| | | | |
|---|---|---|---|
| 4,261,537 A | 4/1981 | Frosch et al. | |
| 4,300,200 A | 11/1981 | Doe et al. | |
| 4,419,079 A | 12/1983 | Georges et al. | |
| 5,057,835 A | 10/1991 | Factor et al. | |
| 5,337,048 A | 8/1994 | Penwill | |
| 5,343,395 A | 8/1994 | Watts | |
| 5,388,785 A * | 2/1995 | Rollet et al. | 244/17.19 |
| 5,420,582 A | 5/1995 | Kubbat et al. | |
| 5,471,205 A | 11/1995 | Izawa | |
| 5,610,764 A | 3/1997 | Faivre et al. | |
| 5,614,807 A | 3/1997 | Duley | |
| 5,666,111 A | 9/1997 | Servat et al. | |
| 5,675,328 A | 10/1997 | Coirier et al. | |
| 5,798,713 A | 8/1998 | Von Viebahn et al. | |
| 6,054,937 A | 4/2000 | Von Viebahn et al. | |
| 6,057,786 A * | 5/2000 | Briffe et al. | 340/975 |
| 6,107,943 A | 8/2000 | Schroeder | |
| 6,111,526 A | 8/2000 | Aymeric et al. | |
| 6,112,141 A | 8/2000 | Briffe et al. | |
| 6,150,960 A | 11/2000 | Voulgaris | |
| 6,161,062 A * | 12/2000 | Sicre et al. | 701/3 |
| 6,272,404 B1 | 8/2001 | Amano et al. | |
| 6,320,579 B1 | 11/2001 | Snyder et al. | |
| 7,106,217 B2 * | 9/2006 | Judge et al. | 340/973 |
| 2003/0193411 A1 * | 10/2003 | Price | 340/973 |

FOREIGN PATENT DOCUMENTS

| | | |
|---|---|---|
| FR | 2444275 | 7/1980 |
| FR | 2730841 | 8/1996 |

* cited by examiner

*Primary Examiner*—Brent Swarthout
(74) *Attorney, Agent, or Firm*—Young & Thompson

(57) ABSTRACT

A method is provided for assisting the piloting of a rotorcraft in which vertical speed variation (DVZ) of the rotorcraft is determined as a function of a horizontal speed variation (DVH) of the aircraft and as a function of data representative of the power (W) absorbed for providing the rotorcraft with lift and forward advance, the ratio between variation speed vertical (DVZ) and the horizontal speed (VH) of the rotorcraft is calculated, and a piloting assistance symbol is presented on a display in a position ($\alpha$) that is a function of the ratio.

13 Claims, 3 Drawing Sheets

METHOD AND A DEVICE FOR PROCESSING AND DISPLAYING AIRCRAFT PILOTING INFORMATION

The present invention relates to a method and to a device for assisting in the piloting of an aircraft, whether real or simulated.

FIELD OF THE INVENTION

The technical field of the invention is that of manufacturing helicopters.

The present invention relates in particular to a method and to a device for processing and/or displaying information for assisting in the piloting of a real or simulated rotorcraft, along a trajectory that has been pre-established in a three-dimensional frame of reference.

The invention relates in particular to an information display device for a rotorcraft pilot in order to assist the pilot in causing the rotorcraft to follow a reference horizontal speed that varies over time.

An object of the invention, associated with a representation of the speed vector, is to make it easy for the pilot to follow a reference horizontal speed while already following a trajectory that has been programmed in three dimensions.

An object of the invention is to present an indicator to the pilot on a display device, making it easy for the pilot to make the necessary corrections for joining a programmed speed without departing from a programmed trajectory. This function must not burden the pilot with an extra work load by presenting content that is too complex to interpret. It must be easy to follow and it must cause the pilot to carry out actions that are simple and intuitive on the flight controls.

BACKGROUND OF THE INVENTION

Various systems for assisting in the piloting of an aircraft have been proposed, most of which are adapted for fixed-wing aircraft.

U.S. Pat. No. 5,337,048 describes a head-up display (HUD) system in which a diagram is generated comprising superposed bars representing pitch angles (nose up or nose down); U.S. Pat. No. 5,675,328 describes a system displaying two slope scales that cross at a safe attitude value; U.S. Pat. No. 5,614,897 describes a system for displaying departures of a real value from a reference value, concerning the speed and the heading of an aircraft.

French patent FR-2 720 522 describes a collimator connected to an imaging sensor for improving the field of view of a pilot.

U.S. Pat. Nos. 5,057,835 and 5,471,205 describe methods of displaying a chart; French patent FR-2 725 808 describes a collimator displaying a runway axis; U.S. Pat. No. 6,150,960 describes a graphics indicator having symbols representative of actual speed and a variety of characteristic speeds (minimum, maximum, maximum endurance); U.S. Pat. No. 5,343,395 describes a guidance system providing a simulated three-dimensional view of the perimeter of a landing strip.

U.S. Pat. No. 6,107,943 describes a method of displaying quantitative information concerning acceleration (or deceleration) of an aircraft taxiing on the ground.

French patent FR-2 730 841 describes a guidance method comprising displaying an artificial horizon line and displaying a ground speed vector by means of a vertical coordinate for slope angle and a horizontal coordinate for heading angle, these coordinates being calculated from signals or data delivered by an attitude heading reference system (AHRS), an anemo-barometric unit, and a global positioning system (GPS) receiver.

U.S. Pat. No. 6,320,579 describes a system displaying three-dimensional symbols representative of departure from a flight path.

U.S. Pat. Nos. 5,798,713 and 6,054,937 describe methods of representing airplane guidance information comprising a horizon, a previously-calculated trajectory for the airplane, and strips representative of a pitch angle or the presence of another airplane.

U.S. Pat. No. 6,111,526 describes a guidance assistance device that displays a horizon with heading graduations, a line with attitude graduations, a symbol representing the longitudinal axis of the airplane, a speed vector symbol representing the track and the slope followed by the airplane relative to the ground, and a guidance window of position that corresponds to the direction of a point on the desired trajectory that is situated at a distance in front of the airplane.

U.S. Pat. No. 5,420,582 describes a method of representing a three-dimensional view including an estimated line of flight predicted for the airplane, together with the position and the attitude of the airplane; a vertical speed scale is also provided.

U.S. Pat. Nos. 4,419,079 and 5,289,185 describe systems for displaying additional symbols relating to the speed to be followed by the aircraft: in the first patent, the pilot must seek to bring the two potential slope symbols to the level of two incidence symbols by manipulating the throttle, to ensure that the airplane retains a chosen speed; according to the second patent, the total energy to be adopted in order to reach a selected speed is displayed by two identical symbols, and the acceleration or deceleration trend is displayed by two other identical symbols.

U.S. Pat. No. 6,272,404 describes apparatus for displaying a target symbol on a HUD giving the direction of the trajectory to be followed by the helicopter fitted with that apparatus.

A difficulty in showing the horizontal component of the speed of an aircraft by a device for displaying information in superposition on the outside environment, the information comprising in particular a horizon bar, a speed vector, and a target to be reached, lies in the fact that horizontal speed does not correspond directly to a magnitude that can easily be represented geometrically in a three-dimensional space representing the outside world.

Furthermore, in a helicopter, controlling speed is difficult, since acting on the stick for controlling cyclic pitch variation in order to modify speed also leads to coupling with other flight parameters. It is thus not easy simultaneously to follow a horizontal speed and an altitude—or else a horizontal speed and a vertical speed—that are both varying.

In prior art methods and devices for displaying piloting assistance symbols superposed on the outside environment, and that are used mainly in fixed-wing aircraft, speed tracking can be performed in several ways:

the pilot may have an indicator presenting, relative to a speed vector, the potential slope that the aircraft would have if it were traveling at constant speed; if this slope does not coincide with the speed vector, then the aircraft is accelerating or slowing down; the pilot has no information about the speed to be followed, but does have information about speed variation, and it is up to the pilot to know the speed to be adopted on the slope; this indication is well adapted to an airplane in which speed is stabilized all along its approach slope and for which there is no need to manage a large amount of deceleration during descent;

the pilot may have an indication requesting acceleration or deceleration in order to join a reference speed; the pilot then controls this parameter in an open loop; the indicator may be proportional to the power demand needed, and may give the pilot an idea of the amount of control to apply; nevertheless, this indication is not correlated with the dynamics of the aircraft and it needs to be interpreted; this indication is similar to that of a flight director and does not enable the pilot to anticipate actions; this system is much less well adapted to a helicopter than it is to an airplane, since with a helicopter, reducing speed requires action to be taken on two controls (cyclic stick and collective stick) whereas in an airplane, action on the power control alone suffices; and the pilot may have a conventional speed indicator, showing the present speed and the speed to be reached on a scale or a dial; that kind of indicator is incompatible with the above-mentioned requirements and can mask the outside environment when presented on a HUD.

Thus, known systems for displaying information for assisting in piloting an aircraft present shortcomings or drawbacks that the present invention seeks to remedy, at least in part.

OBJECTS AND SUMMARY OF THE INVENTION

An object of the invention is to provide an improved method of processing signals and/or data and of displaying piloting assistance information on the basis of said processed signals and/or data.

An object of the invention is to provide such a method that is adapted to rotorcraft.

An object of the invention is to provide a device for implementing such methods.

In a first aspect of the invention, there is provided a method of assisting in the piloting of an aircraft, in which a variation (DVZ) in the vertical speed of the aircraft is determined as a function of a variation (DVH) in the horizontal speed of the aircraft and as a function of data representative of the power absorbed (W) (or controlled) for providing the aircraft with lift and forward drive, a ratio is calculated between the variation (DVZ) in vertical speed and the horizontal speed (VH) of the aircraft, and a piloting assistance symbol is presented on a display, with the position ($\alpha$) of the symbol being a function of said ratio.

The position of the symbol along a vertical axis of the display may vary with the arc-tangent of said ratio.

When the aircraft is a rotorcraft having a lift and forward drive rotor, the position of a member for controlling the collective pitch of the rotor blades can be measured, and said data representative of power can be determined as a function of the result of said measurement.

The mass of the rotorcraft and also ambient temperature and pressure can be measured, and said data representative of power can be determined as a function of the result of said measurements.

In addition to said piloting assistance symbol, the following may be presented to the pilot on the display:

a symbol representative of a horizon, such as a line;

a symbol representative of the slope of the speed vector of the aircraft in a vertical plane and its direction in the horizontal plane, such as a circle associated with two segments in alignment with a diameter of the circle; and a symbol representative of a target direction to be followed by the aircraft.

The symbol representative of a target direction may comprise an outline or frame surrounding the current direction of a straight line passing through the current position of the aircraft and through a point of a trajectory to be followed or joined by the aircraft.

The center of the piloting assistance symbol is situated vertically relative to the center of the symbol representing the speed vector; it may comprise two signs such as chevrons disposed symmetrically about a vertical axis of the display.

In another aspect of the invention, there is provided a device for assisting in piloting a rotorcraft, the device comprising a module for determining vertical speed variation that is arranged to determine vertical speed variation (DVZ) as a function of horizontal speed variation (DVH) and of current power (W) absorbed by the main rotor of the rotorcraft, a module for determining the position ($\alpha$) of a piloting assistance symbol, which module is connected to the module for determining vertical speed variation and is arranged to determine the position ($\alpha$) as a function of the vertical speed variation (DVZ) and the horizontal speed (VH) of the rotorcraft, and a symbol generator connected to the module for determining position ($\alpha$) and arranged to control the display of the symbol.

The device may include a module for determining current power (W) as a function of the position of a member for controlling the collective pitch of the rotor blades, an output from said module being connected to an input of the module for determining vertical speed variation.

The device may include modules or members for measuring the mass of the rotorcraft and ambient temperature and pressure, having outputs connected to an input of the module for determining power (W).

The device may include a comparator receiving as inputs, data (VHC) representative of a reference horizontal speed and data (VH) representative of horizontal speed, and delivering data representative of the horizontal speed variation (DVH) to the module for determining vertical speed variation.

These modules may be incorporated, at least in part, in a computer of the aircraft.

Thus, in another aspect of the invention, there is provided a program for assisting the piloting of an aircraft, which program is carried by a medium or a signal readable by a processor or computer (of an aircraft), and, when executed by the processor or calculator, enables the following operations to be performed:

determining vertical speed variation as a function of horizontal speed variation and data representative of the power absorbed for providing the aircraft with lift and forward drive;

calculating the ratio between the vertical speed variation and the horizontal speed (variation); and causing a piloting assistance symbol to be displayed in a position that is a function of said ratio.

According to another aspect of the invention, there is provided a program comprising code usable by a piloting assistance computer of a rotorcraft, the code comprising code segments enabling the position ($\alpha$) of a piloting assistance symbol to be determined as a function of the horizontal speed (VH) of the rotorcraft, the vertical speed (VZ) of the rotorcraft, the power (W) absorbed for providing the rotorcraft with lift and forward drive, and a reference horizontal speed (VHC).

In another aspect of the invention, there is provided a program usable by a rotorcraft computer to assist the pilot of the rotorcraft, and enabling a symbol to be displayed in application of a method in accordance with the invention.

The simultaneous display on a display device of the piloting assistance symbol, a symbol whose position is representative of the orientation of the aircraft speed vector, and a symbol representative of a direction to be followed by the aircraft, makes piloting easier by means of maneuvers (or commands) serving to reduce the departures between the relative positions along a vertical axis of the respective centers of those three symbols.

The invention which can be used on board any aircraft is of greatest use on board helicopters and other rotorcraft. This function of tracking speed associated with precise trajectory tracking is essential in order to be able to achieve accurate approaches under flying conditions without visibility, in particular using steep approach slopes towards spot landing pads, during which the pilot must perform high levels of deceleration while continuing to follow accurately a descent flight path, in particular close to the ground.

The pilot can equally well make use of a head-up display in which symbols can be seen on a background constituted by the outside surroundings, or a so-called "head-down" display where symbols can be seen on a background of the outside surroundings reproduced by means of a camera or any other sensor or simulator, or else a "head-down" screen where the symbols are displayed alone on a black background.

BRIEF DESCRIPTION OF THE DRAWINGS

Other aspects, characteristics, and advantages of the invention appear from the following description which refers to the accompanying drawings that show, without any limiting character, preferred embodiments of the invention.

FIG. 3 corresponds to an initial configuration; FIG. 5 corresponds to a final configuration in which the three symbols are in alignment and/or concentric; and FIG. 4 corresponds to an intermediate configuration between the two above configurations.

FIGS. 6 and 8 are respectively identical to FIGS. 3 and 5; while FIG. 7 corresponds to a configuration that is intermediate between the two above configurations, but that differs from the intermediate configuration shown in FIG. 4.

MORE DETAILED DESCRIPTION

The invention makes it possible to track accurately a programmed and varying speed of advance, in particular during stages in which the aircraft is to follow accurately a descent or climb axis (trajectory). In this situation, the altitude, the vertical speed, and the horizontal speed of the rotorcraft vary, and the pilot must quickly find an equilibrium position in order to remain on the reference trajectory (slope).

The advantage of the proposed indicator is that it represents the departure of the current speed from the reference speed as an indication of error of the slope associated with the speed vector, which is thus dynamically associated with the aircraft and with piloting parameters. This indication associated with the speed vector thus shows the position the vector will occupy if the pilot returns to the reference speed while using the present power.

The pilot can vary speed to cancel the error, i.e. the distance between the respective centers of the piloting assistance symbol and the speed vector symbol, and the pilot can then adapt the power (by varying collective pitch) in order to bring the speed error indicator onto the proper slope. This control sequence, which corresponds to the illustrations of FIGS. 3 to 5, serves to converge on the required slope and speed.

Figure 6:
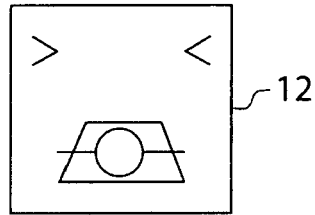
FIGS. 6 to 8 likewise show three successive configurations of the display, each having the three above-mentioned symbols.
Figure 7:
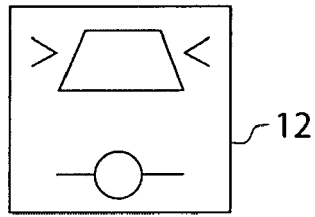
Figure 8:
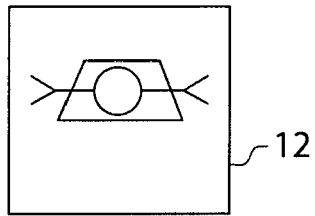

The sequence can be performed in the opposite order, which corresponds to the illustrations of FIGS. 6 to 8.

Figure 1:
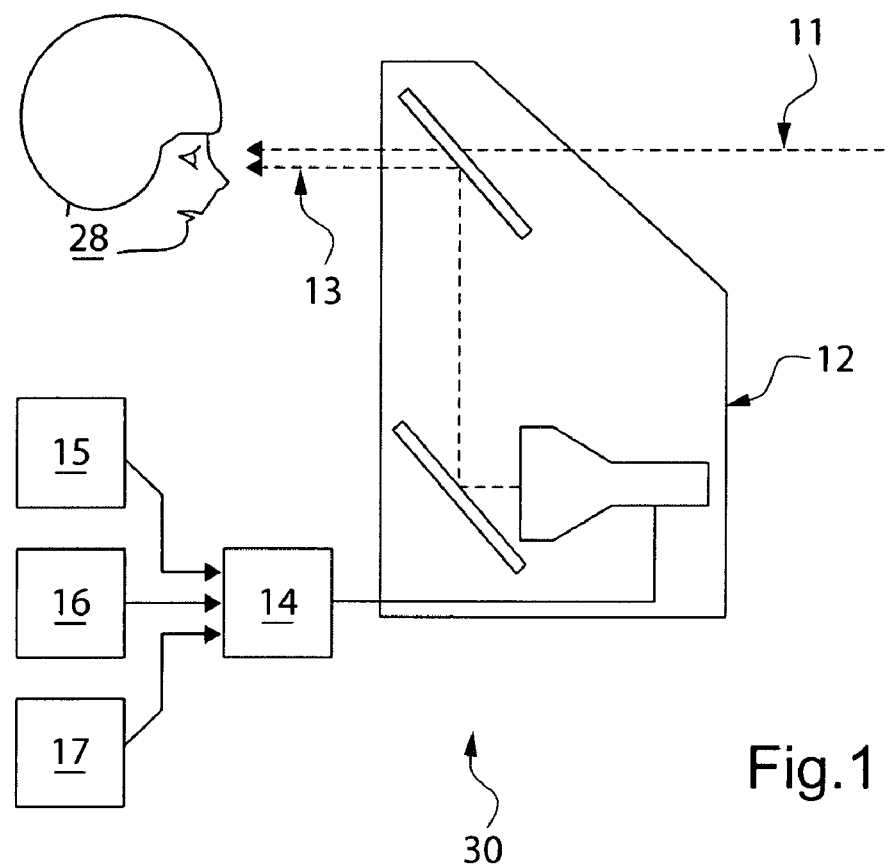
FIG. 1 is a diagram showing the main components of a device of the invention, and the connections between these components.

With reference to FIG. 1 in particular, the proposed invention is usable on any display device 12 projecting piloting or guidance symbols 13 onto the external environment 11, said symbols being generated by a symbol generator 14 to match the environment.

The positions of the symbols are determined as a function of data coming from the aircraft positioning system 15, with the route and speed references to be followed being delivered by the navigation computer 16, and with aircraft attitude data being delivered by the system 17.

The device 12 may be a head-up display device enabling the real external environment to be seen.

It could also be constituted by a device displaying on a head-down screen, either a real view of the outside environment as acquired by a sensor, or a virtual image constructed with the help of a database, or else there may be no information about the outside environment.

The presentation on the device 12 of track and guidance information (desired speed vector, runway symbol, runway axis and slope), matching the outside view, considerably improves the precision of the approach. The strategy of the pilot 28 is to superpose these indicators or symbols—i.e. cause their respective centers to coincide substantially—in order to converge on the desired trajectory or landing point. This procedure is intuitive and effective.

Although speed is not a geometrical parameter, speed variations can lead to geometrical variations.

For given power, a helicopter adopts different slopes depending on its speed of advance. At constant power, slowing the aircraft down leads to a tendency to climb, whereas acceleration leads to a tendency to descend.

Thus, for a given "current" power P, for a horizontal speed of advance VH, and a reference horizontal speed VHC, the transition from VH to VHC leads to a variation in slope corresponding to an angle α of value given by the following formula:

$$\alpha = f1(VH - VHC)$$

in which the function f1 depends on the current speed, on external parameters, and on the performance of the aircraft.

Figure 2:
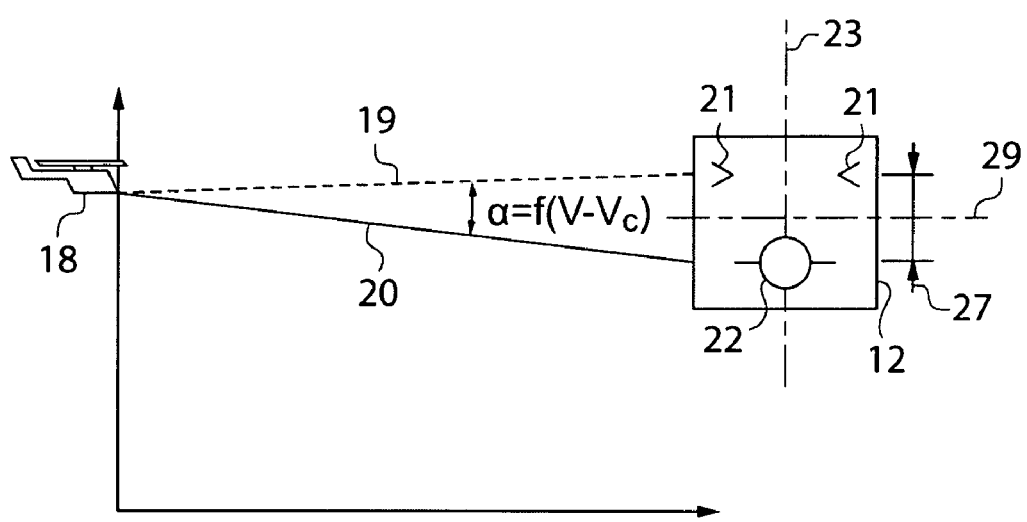
FIG. 2 is a diagram showing the correspondence between two display symbols and the corresponding flight parameters.

Thus, in the example shown in FIG. 2, the aircraft 18 is on the trajectory 20 of slope that corresponds on the display 12 to the position along a vertical axis 23 of the center of the symbol 22 that represents the "speed vector" of the aircraft.

If the pilot slows the aircraft down to approach the reference speed VHC, the slope of the trajectory will "climb" (vary) by the angle α; on the display 12, this angle corresponds to the distance 27 measured along the vertical axis 23 between the respective centers of the symbol 22 and a slope error symbol 21 which in this example is constituted by two chevrons.

Figure 4:
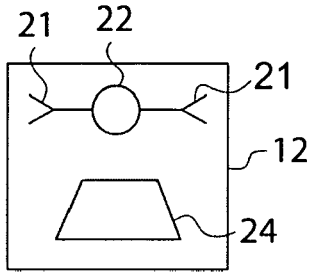

If the pilot acts on the controls of the aircraft to cause both symbols 21 and 22 to coincide, as shown in FIG. 4, without varying the power delivered to the main rotor, that means that for the speed vector corresponding to the slope 19, the rotorcraft will be at the proper speed.

In a helicopter, power control is associated with the collective stick. Horizontal speed is controlled by the cyclic stick, but the variation in speed as controlled in this way gives rise to a variation in altitude.

The position of the speed vector on the head-up display device is directly linked to variations in the position of the cyclic pitch control.

By displaying these symbols, the pilot can see the direction and the magnitude in which action needs to be taken on the controls in order to return to the reference speed.

Figure 3:
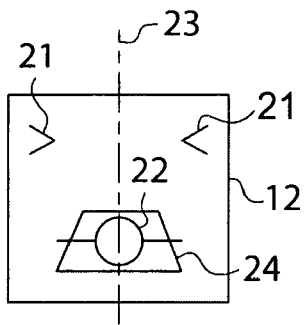
FIGS. 3 to 5 show three successive configurations of the display, each comprising the three above-mentioned symbols.
Figure 5:
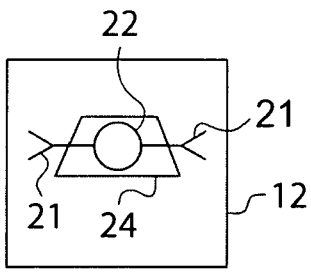

Starting from a configuration shown in FIG. 3, in which the symbol 22 is superposed on a symbol 24 of trapezoidal shape corresponding to the direction of a target such as a landing strip, the pilot can begin by acting on the cyclic pitch control to bring the speed vector 22 onto the speed indicator 21 (as shown in FIG. 4) so that it corresponds to the reference speed; the pilot can then act on the collective pitch control to correct the slope of the trajectory (by adapting the power) until the centers of all three symbols 21, 22, and 24 are superposed, as shown in FIG. 5.

In a variant, starting from a configuration shown in FIG. 6 (identical to FIG. 3), the pilot can adapt the power to bring the slope error indicator 21 onto the reference slope that corresponds to the target 24 that is to be reached (FIG. 7) prior to bringing the speed vector 22 onto the error indicator 21 for eliminating the slope error (FIG. 8).

These two sequences can be mixed together and/or combined.

The indicators 21, 22, and 24 may be associated with a device specifying whether the speed is currently varying, or on the contrary is stable. The pilot thus knows whether the reference is itself varying or whether the reference is stable. For this purpose, the indicator 21 can flash during changes of reference speed.

The proper positioning of the indicator 21 along the axis 23 requires calculation of the variation in slope that enables the reference speed to be joined.

Figure 9:
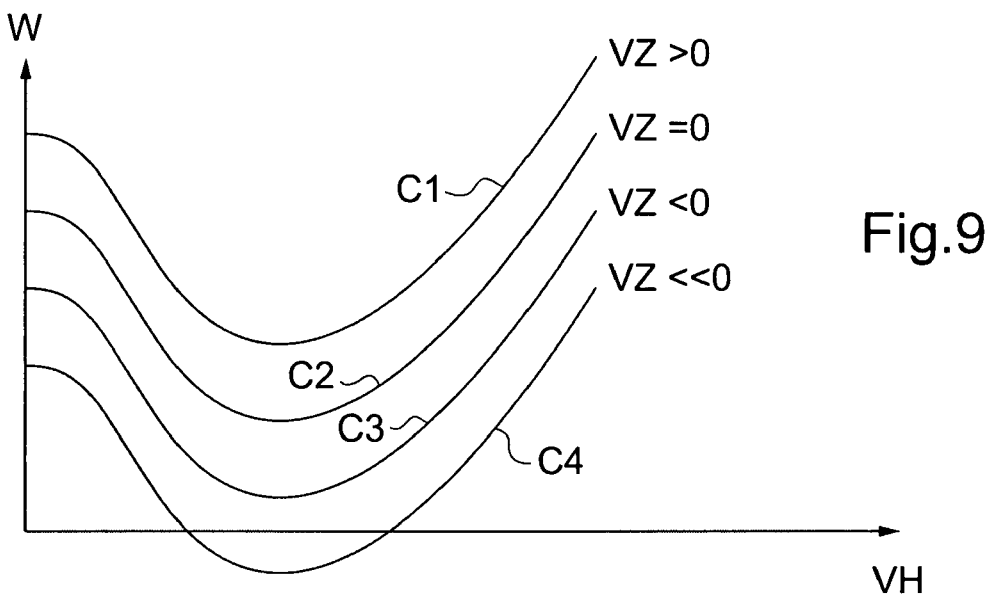
FIG. 9 is a graph plotting a set of curves showing variation in the power consumed by a rotorcraft as a function of horizontal speed for different values of the vertical speed of the rotorcraft.

In stabilized flight, the curve plotting power consumed by a helicopter has the appearance of one of the curves in the set of curves shown in FIG. 9.

Each of these curves shows that the power consumed Wnec is large in stationary flight (when the speed VH is small), then decreases when moving at medium speed VH in translation, and then increases when the helicopter reaches high cruising speeds (right-hand portions of the curves).

Each curve corresponds to a particular vertical speed VZ. The highest curve C1 in the set corresponds to a positive vertical speed; the curve C2 corresponds to level flight (VZ=0), and the lower curves C3 and C4 correspond to two negative speeds VZ.

For a given flying point, and using this graph, by moving along a horizontal line it is possible to deduce the rates of exchange between horizontal and vertical speeds at constant power.

Thus, for example, an increase DVH in the current speed VH can lead to the sink rate to increase by about DVZ=3.5 meters per second (m/s), whereas a reduction in VH by the same amplitude DVH can reduce the sink rate by DVZ=2.5 m/s.

Thus, the set shown in FIG. 9 represents the function f2 defined by DVZ/DVH=f2(W, VH); knowing the current power W, the current horizontal speed VH, the reference horizontal speed VHC, and the current vertical speed VZ, this set of curves (or the corresponding model) makes it possible to calculate the variation DVZ in the speed VZ as a function of the difference DVH between the reference horizontal speed VHC and the speed VH at constant power W.

The variation DVZ calculated from the model serves to determine the corresponding slope variation α, using the formula:

$$\alpha = \arctan(DVZ/DVH)$$

In order to develop the model that enables the ratio DVZ/DVH to be calculated, it is possible to use an empirical approach and/or a theoretical approach.

With an empirical approach, the set of curves at constant VZ (of the kind shown in FIG. 9) can be established by examining measurements taken in flight; the robustness of the algorithm can be reduced if the aerodynamic configuration of the helicopter changes. The relationship between power and flying point can be established by a calibration procedure that freezes the model, but that can be repeated at any time. This relationship can be established initially and then corrected in real time by a method of continuous recording and identification.

Determination of the function f2 can also be based on using theoretical models for calculating the power absorbed, in particular as a function of geometrical characteristics (diameter and chord of the rotor, number of blades) of the rotor for providing the aircraft with lift and forward drive, and as a function of the lift and the drag of the blades.

Whatever the approach selected, it is possible to make use of the measured position of the collective pitch control member (stick) instead of the power control member, since these two magnitudes are associated and vary in comparable manner. Furthermore, power is calculated, by a module 43 in FIG. 10, as a function of current data relating to the mass of the aircraft, and to ambient static pressure and temperature.

The calculation algorithm may also make use of data relating to the aerodynamic configuration of the aircraft (Cx, payload) to engine torque measurements, to the polar plot of the rotor profile.

Figure 10:
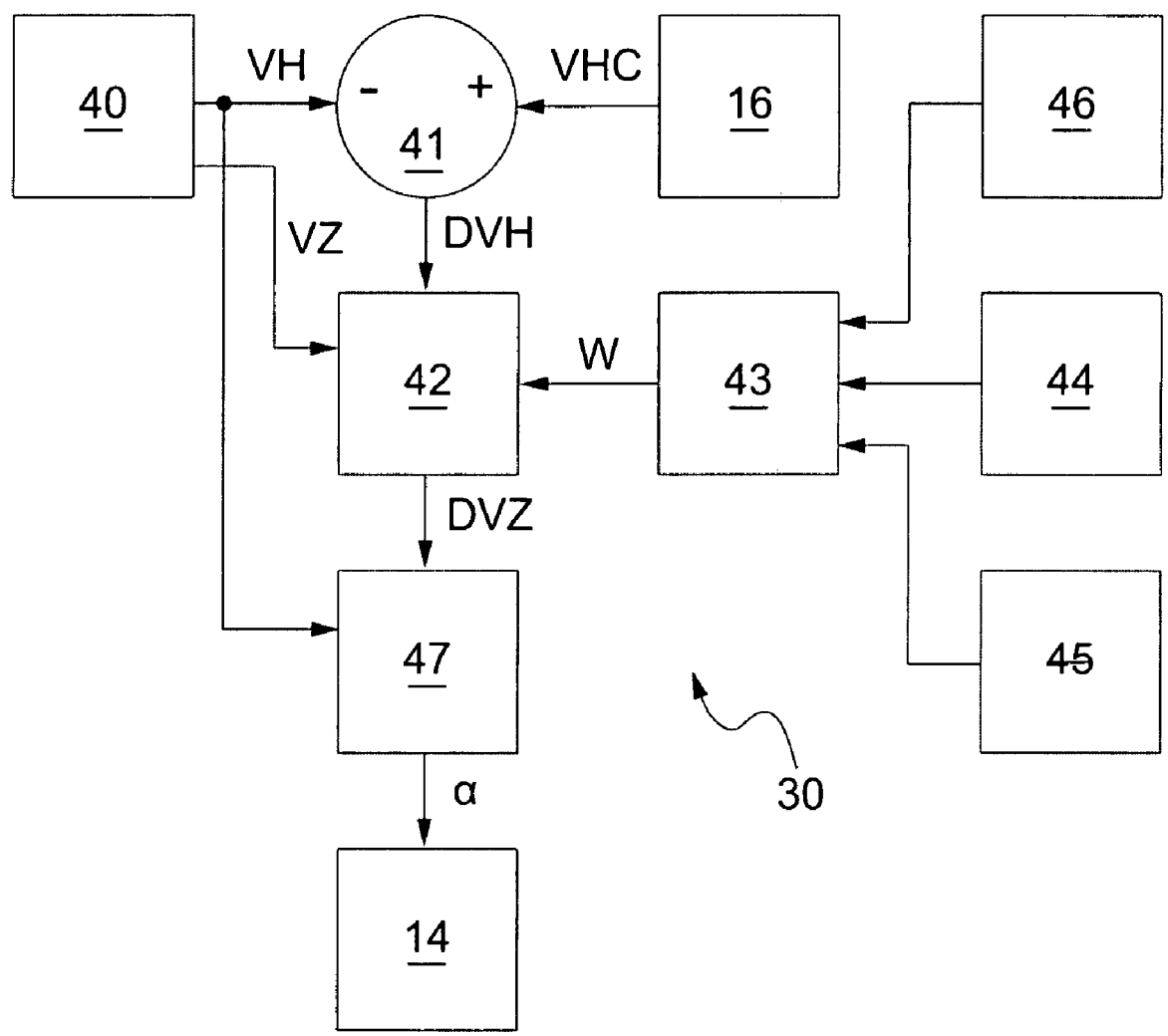
FIG. 10 is a diagram showing the main modules of a system of the invention, the connections between the modules, and the operations that they execute in accordance with the invention.

With reference to FIG. 10, the device 30 of the invention comprises a module 42 for calculating vertical speed variation DVZ as a function of horizontal speed variation DVH (i.e. the difference DVH=VHC−VH) as delivered by a comparator 41, and data representative of power W.

For this purpose, a module 43 estimates the current absorbed power W, in particular from measurement signals or data delivered respectively by a sensor 46 repeating the position of the collective pitch control member, by a system or sensor 44 for measuring the current mass of the rotorcraft, and by a sensor 45 for sensing ambient pressure and temperature.

The comparator 41 receives from the computer 16 reference horizontal speed data VHC, and receives from a module 40 data VH representative of the current speed; for this purpose, the module 40 receives signals from an air speed sensor and/or an inertial unit (not shown); the module also delivers data to the module 42 that is representative of the current vertical speed VZ.

Another module 47 determines the slope variation α from the data DVZ delivered by the module 42 and the speed VH; this variation α is delivered to the symbol generator 14. The generator thus causes the symbol 21 to be displayed at a distance from the symbol 22 that corresponds to this variation.

Several variant implementations can be used for calculating the position of the symbol 21, and in particular:

the indicator may display the departure from the slope enabling the present instantaneous reference speed to be joined. Under such circumstances, the pilot follows information that is varying continuously. This is similar to a flight director. The pilot does not know how quickly the change will take place and does not know when it will cease;

the indicator may also display the departure from the slope enabling the reference speed to be joined at the end of the current change in speed. This solution gives significant anticipation to the pilot enabling better control over speed management. The pilot can then select a strategy for deceleration/acceleration; or the indicator may also display the departure from the slope for joining the instantaneous reference speed expected in x seconds, given that x is the time needed to make a change in speed. This solution provides the pilot with significant anticipation enabling better control over speed.

By means of the invention, the pilot does not seek to catch up with a reference speed by successive iterations, each canceling a departure from a reference, while simultaneously correcting tracking of the vertical trajectory, since the pilot is given direct pre-display of the cyclic pitch control that needs to be adopted to join the reference speed and also with pre-display of the slope correction to be applied to return to the reference trajectory. It is thus possible without iteration to return simultaneously to the reference slope and to the reference speed. This greatly reduces the amount of work needed to follow manually a trajectory and a speed.

The display system of the invention makes use of geometrical information associated with the trajectory of the aircraft, in the same manner as the other indicators present in a head-up display.

What is claimed is:

1. A method of assisting the piloting of an aircraft, comprising:
    determining via a processor a variation (DVZ) in the vertical speed of the aircraft as a function of a variation (DVH) in the horizontal speed of the aircraft and as a function of data representative of the power absorbed (W) by the main rotor of the aircraft used in providing the aircraft with lift and forward drive;
    calculating a ratio between the variation (DVZ) in vertical speed and the horizontal speed (VH) of the aircraft; and
    presenting a piloting assistance symbol (21) on a display (12), with the position ($\alpha$) of the symbol being a function of said ratio.

2. The method according to claim 1, wherein the position of the symbol (21) along a vertical axis (23) of the display varies with the arc-tangent of said ratio.

3. The method according to claim 1, wherein the aircraft is a rotorcraft having a lift and forward drive rotor, and the position of a member for controlling the collective pitch of the rotor blades is measured (46), and that data representative of the power is determined as a function of the result of said measurement.

4. The method according to claim 3, wherein the mass of the rotorcraft and ambient temperature and pressure are measured (44, 45), and said data representative of power is determined as a function of the result of said measurements.

5. The method according to claim 1, wherein, in addition to said piloting assistance symbol (21), the following are presented to the pilot (28) on the display (12):
    a symbol (29) representative of a horizon, such as a line;
    a symbol (22) representative of the direction of the aircraft speed vector, such as a circle associated with two segments in alignment with a diameter of the circle; and
    a symbol (24) representative of a target direction to be followed by the aircraft.

6. The method according to claim 5, wherein the symbol (24) representative of a target direction comprises an outline or frame surrounding the current direction of a straight line passing through the current position of the aircraft and through a point of a trajectory to be followed or joined by the aircraft.

7. The method according to claim 1, wherein the piloting assistance symbol (21) comprises two signs disposed symmetrically about a vertical axis (23) passing through the center of the speed symbol (22).

8. A device for providing assistance in piloting a rotorcraft, the device comprising:
    a module (42) for determining vertical speed variation that is arranged to determine vertical speed variation (DVZ) as a function of horizontal speed variation (DVH) and of current power (W) absorbed by the main rotor of the rotorcraft used in providing the aircraft with lift and forward drive;
    a module (47) for determining the position ($\alpha$) of a piloting assistance symbol (21), which module is connected to the module (42) for determining vertical speed variation and is arranged to determine the position ($\alpha$) as a function of the vertical speed variation (DVZ) and the horizontal speed (VH) of the rotorcraft; and
    a symbol generator (14) connected to the module (47) for determining position ($\alpha$) and arranged to control the display of the symbol (21).

9. The device according to claim 8, further comprising:
    a module (43) for determining the current power (W) as a function of the position of a member for controlling the collective pitch of the rotor blades, an output from the module (43) for determining current power being connected to an input of the module (42) for determining vertical speed variation.

10. The device according to claim 9, further comprising:
    a module (44, 45) for measuring the mass of the rotorcraft and the ambient temperature and pressure, an output thereof being connected to an input of the module (43) for determining power (W).

11. The device according to claim 8, further comprising:
    a comparator (41) receiving as inputs, data (VHC) representative of a reference horizontal speed and data (VH) representative of horizontal speed, and delivering data representative of horizontal speed variation (DVH) to the module (42) for determining vertical speed variation.

12. A computer readable recording medium with a computer program recorded thereon comprising code usable by a piloting assistance computer for a rotorcraft having a lift and forward drive rotor, wherein the code comprises:
    a first code segment for comparing data (VHC) representative of a reference horizontal speed for the rotorcraft and data (VH) representative of the horizontal speed of the rotorcraft, and for delivering data representative of variation (DVH) in the horizontal speed of the rotorcraft;
    a second code segment for determining data representative of variation (DVZ) in the vertical speed of the rotorcraft as a function of the data representative of the variation (DVH) in the horizontal speed of the rotorcraft and data representative of the power (w) absorbed by the rotor of the rotorcraft used in providing the aircraft with lift and forward drive;

a third code segment for calculating the ratio between the data (DVZ) representative of vertical speed variation and the data (VH) representative of the horizontal speed of the aircraft; and a fourth code segment for determining the position (α) of a piloting assistance symbol (21) on a display (12) as a function of said ratio.

13. A computer readable recording medium with a computer program stored thereon usable by a rotorcraft computer to assist the pilot (28) of the rotorcraft, the program enabling a symbol (21) to be displayed using a method in accordance with claim 1.

* * * * *